United States Patent Office 2,801,249
Patented July 30, 1957

2,801,249

PROCESS FOR PRODUCING α-PHENYL SUCCINIMIDES

Charles A. Miller, Detroit, Mich., assignor to Parke, Davis & Company, Detroit, Mich., a corporation of Michigan No Drawing. Application May 2, 1955,
Serial No. 505,511

8 Claims. (Cl. 260—326)

This invention relates to a process for producing α-phenylsuccinimides. More particularly, the invention relates to a process for producing N-methyl-α-phenylsuccinimide.

N-methyl-α-phenylsuccinimide has recently become a very valuable product for the treatment of petit mal epilepsy. According to United States Patent No. 2,643,258 this product can be prepared from phenylsuccinic acid or phenylsuccinic anhydride by reaction with methylamine and heating the resultant product. The yields obtainable by this method are about 65% of the theoretical. However, the process suffers the disadvantage that it requires the use of phenylsuccinic acid or phenylsuccinic anhydride both of which are quite expensive starting materials.

It is an object of the present invention to provide a process for producing N-methyl-α-phenylsuccinimide from readily available cheap starting materials.

It is also an object of the present invention to provide a process for producing N-methyl-α-phenylsuccinimide in higher yields than those customarily obtained by the use of the known method for producing this substance.

In accordance with the invention these and other objects which will appear hereinafter are realized by reacting phenylmaleic anhydride with at least one equivalent of methylamine at a temperature below about 45° C. thereby producing the mono methylamide of phenylmaleic acid, reducing the aliphatic double bond present in the said mono methylamide of phenylmaleic acid and heating the resultant monomethylamide of phenylsuccinic acid at a temperature above 100° C.

In carrying out the reaction between the phenylmaleic anhydride and methylamine at least one equivalent of methylamine is employed. When one equivalent of the methylamine is used the intermediate product is the mono methylamide of phenylmaleic acid whereas if more than one equivalent of methylamine is employed the intermediate product is either a mixture of the aforementioned acid and the methylamine salt or the methylamine salt of the aforementioned acid. The exact nature of the intermediate product is not critical since in most instances it is not isolated or purified in any way before proceeding with the next step of the process. For simplicity, the intermediate product is herein referred to as the "mono methylamide of phenylmaleic acid" it being understood that such expression also includes the methylamine salt and a mixture of the methylamine salt and free acid as well as the free acid itself.

The preferred method of carrying out the reaction is to use at least two equivalents of methylamine for each equivalent of phenylmaleic acid. As indicated above, the reaction should be carried out at a temperature below 45° C. From the standpoint of yields and avoidance of side reactions, it is preferable to employ a temperature between 0 and 30° C. The reaction can be carried out in water, an organic solvent or a mixture of water and a water-miscible organic solvent. Suitable solvents other than water include lower aliphatic alcohols such as methanol, ethanol and isopropanol, cyclic ethers such as dioxane, esters such as ethyl acetate, aqueous mixtures of the foregoing substances and the like. The preferred solvent, particularly when using at least two equivalents of methylamine, is water because it is, of course, the cheapest. The reaction proceeds rapidly and is usually complete within a few minutes.

The second step of the process, that is, the reduction of the aliphatic double bond in the mono methylamide of phenylmaleic acid is preferably carried out using gaseous hydrogen and a metal hydrogenation catalyst. In the preferred method of carrying out the process the mono methylamide of phenylmaleic acid is not isolated after completion of the first step of the process and the reaction mixture is used directly in the reduction step. If the intermediate product has been isolated the reduction can be carried out in water, lower aliphatic alcohols, esters of lower aliphatic acids, cyclic ethers or aqueous mixtures of the same. When the intermediate product is the methylamine salt the preferred solvent is water while if it is the free acid the preferred solvent is a mixture of water and an alcohol. As hydrogenation catalysts, Raney nickel and the noble metal catalysts such as platinum oxide give particularly good results. The hydrogenation can be carried out at temperatures between 15 and 100° C. The pressure of the gaseous hydrogen is not particularly critical and may be anywhere from one atmosphere to a hundred or more. Good results are obtained with hydrogen pressures of about 2½ to 6 atmospheres and consequently there is no need to employ greater pressures.

The third step of the process, that is, the cyclization of the reduction product [the mono methylamide of phenylsuccinic acid, a mixture of said acid and the methylamine salt or the methylamine salt of said acid] to the desired N-methyl-α-phenylsuccinimide is brought about by heating the mono methylamide compound at a temperature above 100° C. The preferred temperature for the reaction is between 120 and 190° C. This phase of the process is most conveniently carried out by removing the hydrogenation catalyst from the reaction mixture obtained in the second stage of the process, distilling the solvents from the reaction mixture and heating the residual mono methyl-amide compound. This heating can be carried out in the absence of a solvent or, if desired, in a solvent having a boiling point above 100° C.

The invention is illustrated by the following examples.

Example 1

4 g. of phenylmaleic anhydride is dissolved in 75 ml. of cold water containing 8 ml. of 40% methylamine. As soon as solution is complete 0.5 g. of Raney nickel hydrogenation catalyst is added and the mixture shaken in a closed vessel with gaseous hydrogen under a pressure of 48 lbs. per sq. inch until the absorption of hydrogen ceases. The vessel is vented and the hydrogenation catalyst removed from the solution by filtration. The clear filtrate is evaporated to dryness and the residue heated until the internal temperature of the mass reaches about 180° C. The residue is cooled and then taken up in and crystallized from 80% ethanol to obtain 3.7 g. of N-methyl-α-phenylsuccinimide; M. P. 70–72° C. The yield is 85% of the theoretical.

Example 2

4 g. of phenylmaleic anhydride is added to 60 ml. of cold water containing ice and 7 ml. of 40% aqueous methylamine. The suspension is stirred until solution is complete and then 100 mg. of platinum oxide hydrogenation catalyst added. The mixture is shaken in a closed vessel with gaseous hydrogen under a pressure of 45 lbs. per sq. inch until the absorption of hydrogen ceases. The vessel is vented and the hydrogenation catalyst removed by filtration. The filtrate is evaporated to dryness and the residue heated until the temperature of the mass reaches about 180° C. The residue is cooled, dissolved in 8 ml. of hot ethanol and the solution decolorized with charcoal. The charcoal is removed, 4 ml. of hot water added to the filtrate and the solution cooled. The desired N-methyl-α-phenylsuccinimide is collected and dried; yield 3.5 g. or 81% of the theoretical; M. P. 70–72° C.

The phenylmaleic anhydride used as one of the starting materials in the practice of the invention can be prepared cheaply and easily by the interaction of maleic anhydride, benzene and chlorine in the presence of ultraviolet light.

What I claim is:

1. Process for the production of N-methyl-α-phenylsuccinimide which comprises reacting phenylmaleic anhydride with at least one equivalent of methylamine at a temperature below 45° C., subjecting the monomethylamide of phenylmaleic acid so obtained to the action of a reducing agent for the aliphatic double bond to obtain monomethylamide of phenylsuccinic acid as a reduction product and heating the resultant reduction product at a temperature above 100° C.

2. Process for the production of N-methyl-α-phenylsuccinimide which comprises reacting phenylmaleic anhydride with at least one equivalent of methylamine at a temperature between 0 and 30° C., subjecting the reaction product without isolation to the action of gaseous hydrogen in the presence of a metal hydrogenation catalyst and heating the resultant reduction product at a temperature between 120 and 190° C.

3. Process for the production of N-methyl-α-phenylsuccinimide which comprises reacting phenylmaleic anhydride with at least two equivalents of methylamine in aqueous solution at a temperature between 0 and 30° C., subjecting the reaction product without isolation to the action of gaseous hydrogen at a pressure between 2½ and 6 atmospheres and at a temperature between 15 and 100° C. in the presence of Raney nickel hydrogenation catalyst, removing the solvent from the reduction mixture and heating the residual reduction product at a temperature between 120 and 190° C.

4. Process for the production of N-methyl-α-phenylsuccinimide which comprises reacting phenylmaleic anhydride with at least two equivalents of methylamine in aqueous solution at a temperature between 0 and 30° C., subjecting the reaction product without isolation to the action of gaseous hydrogen at a pressure between 2½ and 6 atmospheres and at a temperature between 15 and 100° C. in the presence of a noble metal hydrogenation catalyst, removing the solvent from the reduction mixture and heating the residual reduction product at a temperature between 120 and 190° C.

5. Process for the production of N-methyl-α-phenylsuccinimide which comprises reacting phenylmaleic anhydride with at least one equivalent of methylamine at a temperature below 45° C., subjecting the monomethylamide of phenylmaleic acid so obtained to the action of gaseous hydrogen in the presence of a metal hydrogenation catalyst thereby obtaining monomethylamide of phenylsuccinic acid as a reduction product, and heating said reduction product at a temperature above 100° C.

6. Process according to claim 5 in which the catalyst is selected from the class consisting of Raney nickel and the noble metal catalysts.

7. Process according to claim 5 in which the catalyst is Raney nickel.

8. Process according to claim 5 in which the catalyst is platinum oxide.

No references cited.